United States Patent [19]

Hemmings

[11] Patent Number: 5,102,271

[45] Date of Patent: Apr. 7, 1992

[54] COLLET-WEAR REDUCING DRILL BIT

[76] Inventor: David T. Hemmings, 19111 Eguestrian La., Orange, Calif. 92669

[21] Appl. No.: 661,433

[22] Filed: Feb. 25, 1991

[51] Int. Cl.⁵ ............................................. B23B 51/02
[52] U.S. Cl. ..................................... 408/226; 408/144
[58] Field of Search ............... 408/144, 226, 227, 202, 408/230, 241 S

[56] References Cited

U.S. PATENT DOCUMENTS

| | | | |
|---|---|---|---|
| 4,006,996 | 2/1977 | Kasabian | 408/226 |
| 4,232,985 | 11/1980 | Nielsen | 408/226 |

FOREIGN PATENT DOCUMENTS

| | | | |
|---|---|---|---|
| 3526162 | 1/1987 | Fed. Rep. of Germany | 408/226 |
| 20513 | of 1912 | United Kingdom | 408/226 |
| 903088 | 8/1962 | United Kingdom | 408/238 |

Primary Examiner—Daniel W. Howell
Attorney, Agent, or Firm—William L. Chapin

[57] ABSTRACT

An improved drill bit having a generally cylindrically shaped shank has a reduced diameter rear shank portion forming a central coaxial stem with a rear transverse face comprisingn the butt end of the drill bit. An annular wear reduction ring made of softer material than the shank material and having an outer diameter approximately equal to the diameter of the shank forward of the reduced diameter portion of the shank fits over the stem. The softness of the wear reduction ring protects collets, into which the bit is inserted to and removed, from abrasive wear, thereby extending useful life of the collet.

13 Claims, 2 Drawing Sheets

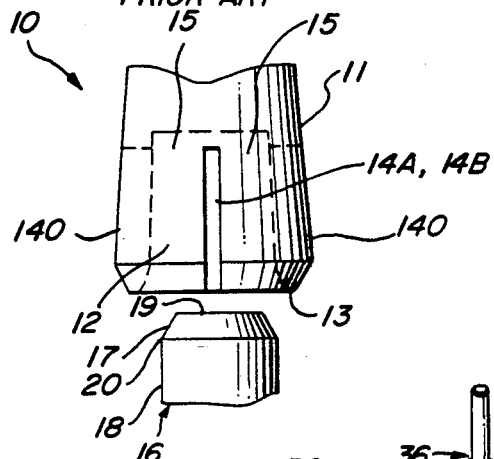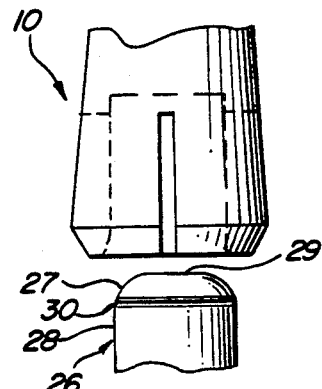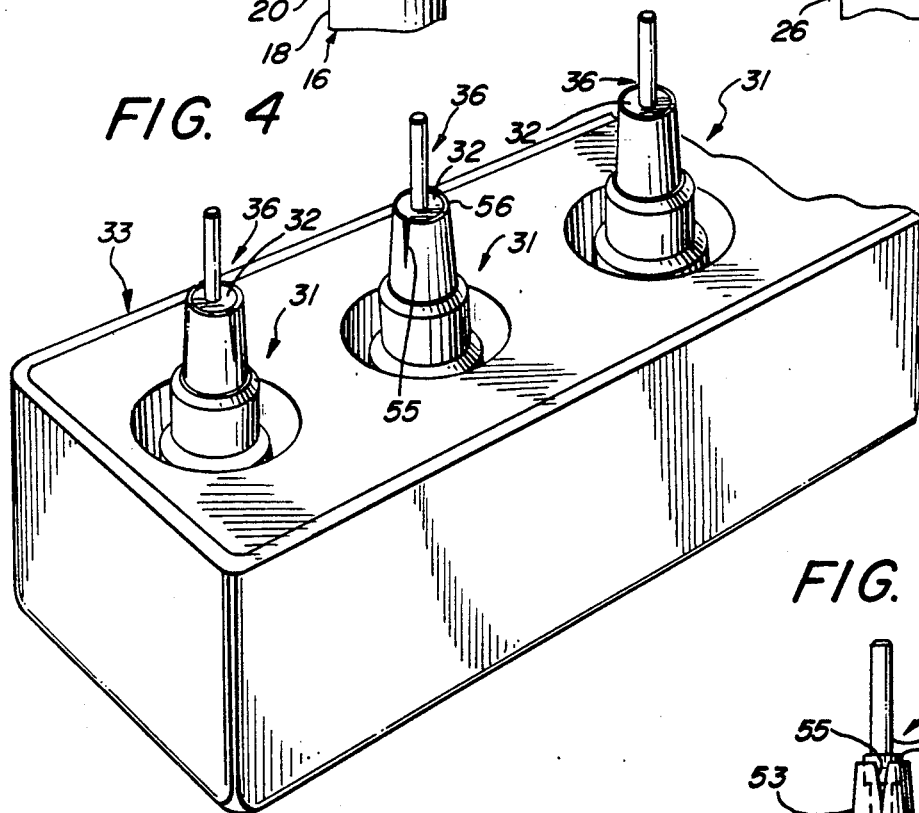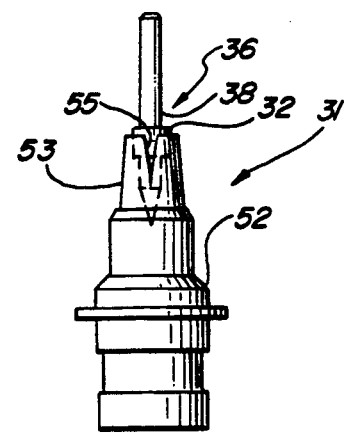

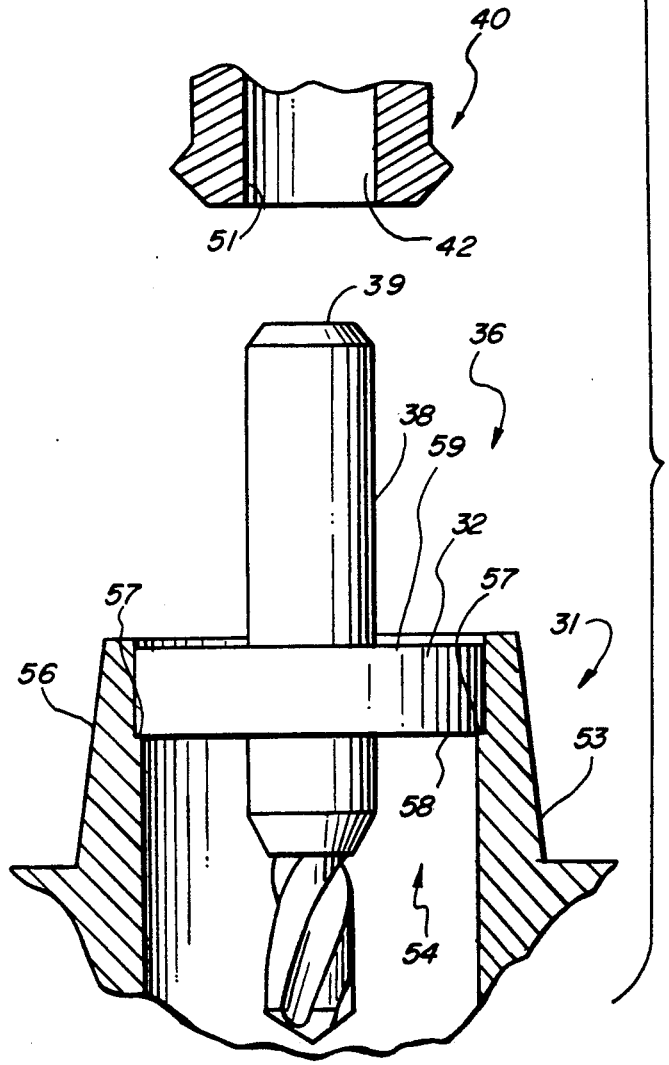
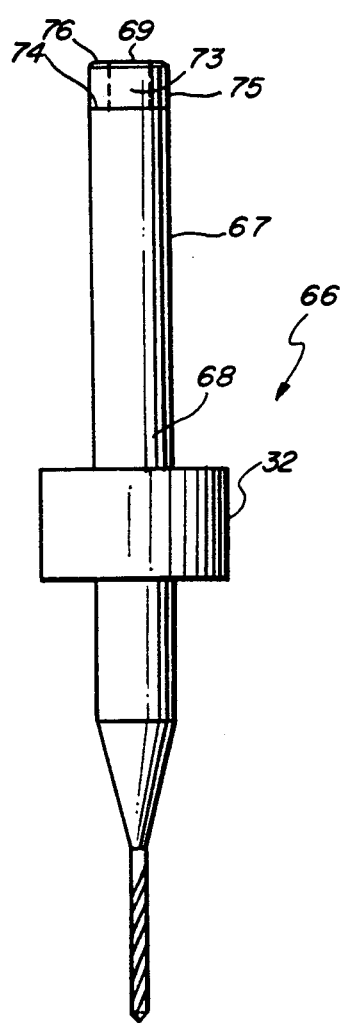

COLLET-WEAR REDUCING DRILL BIT

BACKGROUND OF THE INVENTION

A. Field of the Invention

The present invention relates to drill bits and drilling machines. More particularly, the invention relates to an improved drill bit which reduces wear on collets into which the bit may be inserted into and removed from.

B. Description of Background Art

Drill bits or "drills" as they are frequently referred to are employed in a wide range of applications. One industry which uses drills in large quantities is the printed circuit board manufacturing industry. Printed circuit boards are used in a wide variety of electronic and electrical equipment in the consumer, commercial, industrial and military markets. Holes are drilled through the board to receive the leads of electronic components.

Typical printed circuit boards used in relatively simple consumer electronic equipment may require the drilling of 100 to 5,000 holes, in sizes ranging from 0.004 inch to 0.250 inch in diameter. More complex electronic equipment may employ printed circuit boards which require drilling as many as 50,000 holes of various sizes through the board.

Because of the large numbers of holes of various sizes which must be drilled at precisely determined locations of a printed circuit board, automatic drilling machines are frequently employed for this purpose.

Typical automatic drilling machines utilize a spindle with attached chuck, usually of the collet type. The collet holds a drill bit, and revolves about a vertically oriented axis. A two-axis servomechanism drives the spindle to precisely determined locations in an X-Y coordinate plane.

Typically, a set of hole coordinates is pre-programmed on a storage medium such as a paper tape, magnetic tape or disc, or the like. The data from the storage medium are then loaded into a controller which provides drive signals to the drilling machine. Such machines are referred to generically as "N/C" (Numerical Control) machine tools.

After the spindle of the drilling machine is located precisely in a X-Y coordinate plane, the spindle is moved downwards in the Z direction along its longitudinal axis into contact with a printed circuit board, or a stack of boards, to drill holes at precisely determined locations on the board(s).

Now as stated above, typical printed circuit boards use holes of various sizes adapted to receive the conductive leads of various size electronic and electrical components. Accordingly, most automatic drilling machines are provided with a capability for automatically removing and re-fitting different size drill bits into the collet of the drilling spindle. Drill bit sizes constitute another set of data pre-programmed into the data storage medium loaded into the N/C controller. Drill bits are also changed automatically after a pre-determined number of holes have been drilled, replacing a dull drill bit with a freshly sharpened bit.

Typically, N/C drilling machines used for printed circuit board manufacture utilize a collet-type chuck. The collet consists of a longitudinally split bushing having an outwardly flared lower end, and an entrance bore a few thousandths of an inch larger than the outer diameter of the shank of the drill bit which the collet is adapted to receive. To install a drill bit in the collet, the spindle is positioned above the shank of a selected drill bit resiliently held vertically upright in a cylindrically-shaped, elastic gripper. A row of such grippers, each holding a different drill bit, is typically held in an elongated structure referred to as a tool pod.

With a collet positioned over the shank of a selected drill bit, the collet is moved longitudinally downwards into contact with the shank of the drill bit, and further downwards until the shank of the bit is inserted a predetermined longitudinal distance within the bore of the collet. The collet segments are then allowed to move radially inwards into clamping contact with the outer circumferential surface of the shank. The spindle is then moved vertically upwards, pulling the selected drill bit from its tool pod gripper.

Usually, a very small clearance exists between the inner diameter of an opened collet and a drill bit shank. Thus, even a small angular deviation between the longitudinal axes of the collet and drill bit shank can cause the shank of the drill bit to scuff the inner surface of the collet. After a sufficient number of drill bit loading and unloading cycles, this scuffing action can cause the collet opening to become eccentric. That eccentricity can result in drilling quality problems such as oversize holes, drill breakage and drill wander.

Scuffing contact between a collet and drill bit shank can cause problems in addition to collet wear, as will now be described.

Drill bits of the type used to drill holes in printed circuit boards are frequently provided with an annular ring that tightly grips the shank of the drill bit. The lower face of the ring is positioned a precisely determined distance rearward from the point of the drill bit, thus providing means for precisely controlling the insertion depth of the drill bit through a stack of boards. An insertion depth-limiting ring of the type described also provides a convenient structure for elastic engagement by a tool pod gripper.

Grippers used with drill bits having insertion depth-limiting rings typically consist of a longitudinally split, cylindrical elastic bushing having an upwardly facing bore opening. The bore of the bushing is often fitted with an inwardly projecting annular flange to limit the depth of insertion of the drill bit ring into the tool pod gripper. Even slight wear of the plastic gripper bushing can cause misalignment between the axis of the drill bit shank and the collet axis. As a result of this misalignment, downward movement of the collet to engage the drill bit exerts a downward force on the shank of the bit. This downward force during tool change is typically about 20 pounds. With sufficient angular misalignment between the collet and the drill bit shank, a downward force may be exerted on the shank. That downward force may be sufficiently large to push the shank through the insertion depth-limiting ring.

With the above-described problems associated with engagement of drill bits with a collet in mind, an improved drill bit was conceived of in an effort to alleviate those problems.

OBJECTS OF THE INVENTION

An object of the present invention is to provide an improved drill bit which reduces wear on collets into which the bit is adapted to be inserted into and removed from.

Another object of the invention is to provide an improved drill bit of the type having an attached annular depth-limiting ring, in which downward force on the shank of the bit during insertion into a collet is reduced.

Various other objects and advantages of the present invention, and its most novel features, will become apparent to those skilled in the art by perusing the accompanying specifications, drawings and claims.

It is to be understood that although the invention disclosed herein is fully capable of achieving the objects and providing the advantages described, the characteristics of the invention described herein are merely illustrative of the preferred embodiment. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends an improved drill bit which causes less wear on collets than prior art drill bits. The improved drill bit according to the present invention has fitted to the butt end of the shank an annular ring made of a softer material than the material of which the collet is made. In the preferred embodiment of the improved drill bit according to the present invention, an annular groove is formed in a portion of the shank of a drill bit adjacent the butt end of the shank, resulting in a reduced diameter, central coaxial stem. A plastic ring is press-fitted over the stem. The outer diameter of the plastic ring is preferably approximately the same size as the outer diameter of the drill bit shank forward of the annular groove. When the bit is inserted into the collet, the ring first contacts the bore opening and inner cylindrical surface of the collet. Since the plastic is softer than the collet material, scuffing of the collet bore is prevented.

BRIEF DESCRIPTION OF THE DRAWINGS

FIG. 1 is a fragmentary view of a prior art drill bit shank and collect positioned to receive the bit.

FIG. 2 is a fragmentary view similar to FIG. 1, showing an improved drill bit.

FIG. 3 is a side elevation view of a gripper, showing a drill bit fitted with an insertion depth-limiting ring being held by the gripper.

FIG. 4 is a fragmentary upper perspective view of a tool pod holding a plurality of grippers, each containing a separate drill bit.

FIG. 5 is a longitudinal sectional view of the gripper and drill bit of FIG. 3, and a collect positioned above the shank of the drill bit in a position ready to insertably receive the shank.

FIG. 6 is an elevation view of an improved drill bit according to the present invention.

DETAILED DESCRIPTION OF THE INVENTION

FIG. 1 illustrates a prior art drill bit and collect chuck adapted to receive and hold the bit. As shown in FIG. 1, collect chuck or collect 10 includes a frusto-conically shaped body 11 having a generally cylindrically shaped, coaxial bore 12 which extends upward from the larger diameter, lower transverse face 13 of the body.

Body 11 of collect 10 has at least one longitudinally disposed, rectangularly shaped slot or kerf 14 through the tapered wall of body, extending longitudinally upwards from lower transverse face 13 of the body. Typically, at least one pair of diametrically opposed kerfs is provided in body 11. As shown in FIG. 1, two pairs of kerfs 16 are provided in body 11: front and rear kerfs 14A and 14B, and left and right side kerfs 14C and 14D, the latter being spaced apart at ninety-degree circumferential angles from the front and rear kerfs.

The function of kerfs 14 is to allow adjacent side wall sections 15 of body 11 to move elastically outwards. Radially outward movement of side wall sections 15 increases the diameter of bore 12 of body 16, allowing the bore to expand to receive the cylindrical shank of a drill bit.

A prior art drill bit 16 is shown positioned below bore 12 of collet 10, in a position to be received by the collet. Drill bit 16 is made of tungsten carbide. A chamfer 17 is formed between shank 18 and butt-end 19 of drill bit 16. Thus, the diameter of drill bit 16 tapers to a smaller diameter at the butt end than the diameter of shank 18 rearward of chamfer 17. This tapering of chamfer 17 facilitates insertion of shank 18 into bore 12 of collet 10.

As shown in FIG. 1, chamfer 17 is straight and angular, forming a sharp intersecting circular ridge or ring edge 20 with shank 18 at the rear end of the chamfer. Chamfer 17 is necessarily flat because of the difficulty of grinding a curved surface on a material of great hardness such as tungsten carbide. Sharp edge 20 tends to score the inner wall surface 21 of collet 10 adjacent bore 11, when drill bit 16 is inserted into the collet. After a sufficient number of drill bit loading and unloading cycles, the scoring action of edge 20 of bit 16 on bore walls 21 can cause the diameter of bore 12 to be eccentrically enlarged. That eccentricity can result in drilling quality problems such as oversize holes, drill breakage and drill wander.

FIG. 2 shows an improved drill bit 26 having a shank 28 made of stainless steel. Drill bit 26 may have a carbide tip, not shown. Since the shank 28 of improved drill bit 26 is made of stainless steel, a chamfer 27 formed between shank 28 and butt end 29 of the drill bit may have ground therein a curvilinear, or "radiused" longitudinal cross section. The radiused surface of chamfer 27 results in a smooth transition area 30 being formed with shank 28 of bit 26. The smoothness of transition area 30 ensures that collet 10 will not be scored when bit 26 is inserted to and removed from the collet.

An additional advantage is afforded by making the shank 28 of drill bit 26 of stainless steel. Thus, as shown in table 1, stainless steel is softer than the material of which typical collets are made. The reduced hardness of the stainless steel shank also protects the collet from wear.

TABLE 1

| Hardness cross references | $R_C$ Scale | $R_A$ Scale |
| --- | --- | --- |
| Stainless shank hardness | 55 | 78.5 |
| Drilling machine collet hardness | 60 | 81.2 |
| Carbide hardness | — | 92.5/92 |

From the foregoing discussion, it is apparent that the wear of collets used to hold improved drill bit 26 will be greatly reduced, as compared to the wear which would be encountered with carbide drill bits of the type having a carbide shank as well as a carbide cutting tip. However, it would also be desirable to provide solid carbide drill bits with a capability for reducing collet wear. Also, other problems may be encountered with drill bits used in automatic drilling machines. For these reasons, a further improvement in drill bits was conceived of, as will now be described:

FIG. 3 illustrates a gripper 31 used to hold a drill bit 36, the shank 38 of which bit is fitted with an insertion depth-limiting ring 32. FIG. 4 shows a tool pod 33 holding a number of grippers 31, each gripper 31 holding a separate drill bit 36. The arrangement of bits 36 held in gripper 31 placed in tool pod 33 is typical of that employed in automated drilling machines. Thus, as shown in FIG. 5, a servomechanism (not shown) comprising part of an automatic drilling machine positions a collet 40 over the shank of a selected drill bit 36. The longitudinal axis of bore 42 of collet 40 is brought into alignment with the longitudinal axis of drill bit 36. Then the collet is moved downwards sufficiently far for the shank 38 of drill bit 36 to be clampingly engaged within the bore 42 of collet 40. Since ring 32 of drill bit 36 is resiliently engaged by gripper 31, upward movement of collet 40 pulls drill bit 36 upwards out of the gripper, allowing collet and bit to be moved to a desired drilling location.

The structure and function of gripper 31 may be best understood by reference to FIGS. 3-5. As shown in FIG. 3, gripper 31 has a longitudinally elongated, circularly symmetric base 52 made of metal or other rigid material. A bushing 53 having a generally cylindrical base 54 extends upwards from base 52. Bushing 53 is preferably made of a durable resilient plastic such as nylon. The diameter of bore 54 of bushing 53 is slightly smaller than the outer diameter of ring 32 of drill bit 26. Also, bushing 53 has a longitudinally disposed slot 55 cut through the circumferential wall 56 of the bushing. Slot 55 extends longitudinally downwards from the upper annular wall surface 57 of bushing 53. Thus, wall 56 may elastically deform radially outwards when ring 32 of drill bit 26 is inserted downwards into bore 54 of gripper 31, thereby holding ring and attached drill bit elastically within the gripper.

Typically, bore 54 of gripper 53 is provided with a radially inwardly projecting annular flange 57 which forms a ledge for seating the lower annular surface 58 of ring 32 of drill bit 36, as shown in FIG. 5.

After a drill bit 36 of a desired size has been removed by the action of collet 40 from a particular gripper 31 in tool pod 33, and used to drill a desired number of holes, the bit is returned to its gripper. The collet may then be moved into alignment with a different size drill in another gripper 31, remove that drill, drill a desired number of holes, and return that drill to its gripper.

After a number of removal and re-insertion cycles of a drill bit 36 with a gripper 31, the bore 54 of bushing 53 of the gripper begins to wear. Wear of gripper bushing 53 can result in misalignment between the longitudinal axis of a drill bit 36 and the longitudinal axis of the bushing. That misalignment in turn results in misalignment between the axis of drill bit 36 and the axis of collet 40. Even a small misalignment can cause shank 38 of drill bit 36 to scuff bore walls 51 of collet 40, as will now be explained.

Referring now to FIG. 5, the outer diameter of shank 38 of a typical drill bit might be 0.125 inch. For use with a drill bit having a shank of this diameter, bore 42 of collet 40 would typically have a diameter of 0.125 inch. Now a typical extension of shank 38 of drill bit 36 above the upper annular surface 59 of ring 32 would typically be approximately 0.700 inch. The small clearance between the O.D. of shank 38 of drill bit 36, and the I.D. of bore 42 of collet 40, causes even a small angular misalignment between the axes of the drill bit and collet to result in scuffing contact between the shank and bore walls of the collet. This angle is equal to the arctangent of the ratio of the diameter clearance to the shank extension length. Thus, for a clearance of 0.003 inch and an extension length of 0.7000 inch, the angle is given by arctangent of (0.003/0.700), or 0.25 degrees. Thus, even a small angular misalignment of 0.25 degrees can cause scuffing of collet 40 by shank 38 of bit 36, for collets and bits of typical sizes.

Another problem can be caused by interfering scuffing contact between the butt end 39 of drill bit 36 with bore walls 51 of collet 40, as will now be described. During "tool change," i.e., downward movement of collet 20 relative to gripper 31 to remove or replace a drill bit 36, a fairly large actuating force is usually exerted on the collet by the drilling machine. This downward force is typically about 20 pounds. With that amount of downwardly directed force, scuffing action between the bore 42 of a misaligned drill bit 36 can result in downward force being exerted on the shank which is sufficient to push the shank through ring 32. The improved drill bit 66 according to the present invention, shown in FIG. 6, solves the problems of collet wear and ring detachment described above.

Referring now to FIG. 6, an improved drill bit 66 according to the present invention is shown. Bit 66 may be made of stainless steel, carbide or other material of any desired hardness. Also, the shank 68 of drill bit 66 may be press-fitted with an insertion depth-limiting ring 72, if desired.

As shown in FIG. 6, that portion of the cylindrical wall 67 of shank 68 adjacent butt end 69 of bit 66 is undercut, leaving a central coaxial stem 73 extending rearward from an annular flange wall 76. An annular shaped wear reduction ring 75 is fitted coaxially over stem 73.

Wear reduction ring 75 is made of a material which is substantially softer than the material from which collet 40 is made. Also, the material of which wear reduction ring 75 is made preferably has a relatively low coefficient of sliding friction in contact with the steel of which collet 60 is made. Thus, a suitable choice of materials for wear reduction ring 75 would be nylon, TEFLON, DELRIN or similar plastic.

Ring 75 preferably has a length equal to the length of the stem 73. The outer diameter of ring 75 is preferably approximately equal to the diameter of shank 68. Desirably, the rear annular surface 76 of ring 76 is chamfered.

Now when a collet 40 is moved downward into contact with shank 68 of drill bit 66, any misalignment between the longitudinal axes of the drill and collet will cause wear reduction ring 75 to initially contact bore wall 51 of the collet. As the collet moves downward relative to shank 68 of bit 66, the softness of ring 75 ensures that bore wall 51 will not be scuffed. Also, the lubricity of ring 75 facilitates sliding motion of the collet 20 relative to the ring, thus assuring that a large downwardly directed force cannot be exerted on shank 68 of drill bit 66. Thus, the novel drill bit 66, fitted with wear reduction ring 75 as described, greatly reduces collet wear, and minimizes the possibility of a collet pushing a drill bit through its insertion depth limiting ring, during tool change.

Wear reduction ring 75 of drill bit 66 may be color coded, if desired, to indicate drill flute length, drill style (i.e., configuration) or other such parameters. Wear reduction ring 75 may also have imprinted thereon drill size, bar code information etc.

What is claimed is:

1. An improved drill bit for use with a collet chuck, said drill bit having a chamfered shank section, said chamfer joining the butt end of said drill bit to the shank of said drill bit, at least that portion of said shank adjacent said butt end being made of a material of less hardness than the material of which said collet chuck is made.

2. The drill bit of claim 1 wherein said chamfered section is further defined as having a curvilinear longitudinal cross-sectional shape.

3. The drill bit of claim 1 wherein the cutting tip of said drill bit is made of carbide.

4. The drill bit of claim 1 wherein said softer shank section is made of stainless steel.

5. An improved drill bit which provides increased resistance to wear of chucks which said bit may be repetitively inserted into and withdrawn from, said drill bit having an elongated generally cylindrically shaped shank section, said shank having a transversely disposed butt-end wall, and said drill bit having an annular groove formed in said shank adjacent said butt-end wall, said groove forming a central coaxial stem, said stem having fitted thereover an annular wear-protection ring.

6. The improved drill bit of claim 5 wherein said wear-protection ring is further defined as having an outer diameter substantially equal to the outer diameter of said ungrooved portion of said shank.

7. The improved drill bit of claim 6 wherein said wear protection ring is further defined as having a chamfered rear surface.

8. The improved drill bit of claim 5 wherein said wear protection ring is made of a material which is softer than the material of which said shank is made.

9. The improved drill bit of claim 8 wherein said material of which said wear protection ring is made is further defined as being a polymer.

10. The improved drill bit of claim 7 wherein said wear protection ring is further defined as having a chamfered rear surface.

11. An improved drill bit comprising:
a. a front fluted cutting section,
b. a rear cylindrical shank coaxial with said front fluted cutting portion and extending rearward therefrom, a rear portion of said shank having a reduced diameter central coaxial stem extending forward from the rear transverse face of said shank, and
c. a generally annularly shaped wear reduction ring fitted over said stem, said wear reduction ring having an outer cylindrical surface which is generally coextensive with that portion of the outer cylindrical wall surface of said shank forward of said stem.

12. The improved drill bit of claim 11 wherein said wear reduction ring is made of a material having a hardness less than the hardness of the material of which said shank is made.

13. The improved drill bit of claim 12 further including an annular depth insertion limiting ring attached coaxially to the shank of said drill bit.

* * * * *